(12) United States Patent
Kroeger

(10) Patent No.: US 10,916,035 B1
(45) Date of Patent: Feb. 9, 2021

(54) CAMERA CALIBRATION USING DENSE DEPTH MAPS

(71) Applicant: Zoox, Inc., Foster City, CA (US)

(72) Inventor: Till Kroeger, San Francisco, CA (US)

(73) Assignee: Zoox, Inc., Foster City, CA (US)

(*) Notice: Subject to any disclaimer, the term of this patent is extended or adjusted under 35 U.S.C. 154(b) by 131 days.

(21) Appl. No.: 16/206,534

(22) Filed: Nov. 30, 2018

(51) Int. Cl.
| | | |
|---|---|---|
| *G06T 7/80* | (2017.01) | |
| *G06T 7/521* | (2017.01) | |
| *G06T 7/13* | (2017.01) | |
| *H04N 5/247* | (2006.01) | |
| *G06K 9/62* | (2006.01) | |
| *H04N 17/00* | (2006.01) | |
| *G05D 1/02* | (2020.01) | |
| *G06T 17/20* | (2006.01) | |

(52) U.S. Cl.
CPC ............ *G06T 7/80* (2017.01); *G05D 1/0212* (2013.01); *G05D 1/0246* (2013.01); *G06K 9/6215* (2013.01); *G06T 7/13* (2017.01); *G06T 7/521* (2017.01); *H04N 5/247* (2013.01); *H04N 17/002* (2013.01); *G06T 17/20* (2013.01); *G06T 2207/10028* (2013.01); *G06T 2207/30244* (2013.01)

(58) Field of Classification Search
CPC .. G06T 7/13; G06T 7/521; G06T 7/80; G06T 17/20; G06T 2207/10028; G06T 2207/30244; G05D 1/0212; G05D 1/0246; G06K 9/6215; H04N 5/247; H04N 17/002
USPC .......................................................... 701/28
See application file for complete search history.

(56) References Cited

U.S. PATENT DOCUMENTS

| | | | |
|---|---|---|---|
| 2012/0035799 A1* | 2/2012 | Ehrmann | A63H 17/00 701/28 |
| 2014/0201126 A1* | 7/2014 | Zadeh | A61B 5/165 706/52 |
| 2015/0379766 A1* | 12/2015 | Newman | G06T 7/246 356/5.01 |
| 2018/0189565 A1* | 7/2018 | Lukierski | H04N 5/23238 |
| 2018/0276841 A1* | 9/2018 | Krishnaswamy | G06K 9/00671 |
| 2018/0288320 A1* | 10/2018 | Melick | G01S 17/86 |
| 2018/0307238 A1* | 10/2018 | Wisniowski | G01S 17/86 |
| 2019/0120947 A1* | 4/2019 | Wheeler | G01S 17/42 |
| 2019/0156520 A1* | 5/2019 | Mammou | G06T 7/50 |
| 2019/0208181 A1* | 7/2019 | Rowell | H04N 5/23267 |
| 2019/0271549 A1* | 9/2019 | Zhang | G01C 21/20 |
| 2019/0311485 A1* | 10/2019 | Buczko | G06T 7/97 |
| 2019/0325595 A1* | 10/2019 | Stein | G06T 7/579 |
| 2019/0339356 A1* | 11/2019 | Schildknecht | G01S 11/12 |
| 2020/0064483 A1* | 2/2020 | Li | G01S 17/87 |

\* cited by examiner

*Primary Examiner* — Atul Trivedi
(74) *Attorney, Agent, or Firm* — Lee & Hayes, P.C.

(57) ABSTRACT

This disclosure is directed to calibrating sensor arrays, including sensors arrays mounted on an autonomous vehicle. Image data from multiple cameras in the sensor array can be projected into other camera spaces using one or more dense depth maps. The dense depth map(s) can be generated from point cloud data generated by one of the sensors in the array. Differences determined by the comparison can indicate alignment errors between the cameras. Calibration data associated with the errors can be determined and used to calibrate the sensor array without the need for calibration infrastructure.

20 Claims, 8 Drawing Sheets

CAMERA CALIBRATION USING DENSE DEPTH MAPS

BACKGROUND

The use of sensors by various systems requires accurate calibration to be useful. For example, an autonomous vehicle may have multiple cameras, LiDAR sensors, radar sensors, time-of-flight sensors and/or the like to detect objects, e.g., objects approaching the vehicle and/or objects the vehicle is approaching, and sensor data about those objects can be necessary to navigate relative thereto. In some environments, including those in which pedestrians, bicyclists, other vehicles, and/or static objects may be present, improperly calibrated sensors can result in unsafe conditions, even collisions. Some conventional calibration techniques use infrastructure, such as fiducial markers, to calibrate sensors. For example, by capturing data of a fiducial marker, a correction term can be determined and applied to subsequently-captured data. While the infrastructure may be readily available at a location at which a system is manufactured or at other locations, subsequent calibration requires bringing the system (e.g. an autonomous vehicle) to a location that has infrastructure, resulting in undesirable downtime for the system and/or, for those examples which rely on sensors for navigation, potentially unsafe travel to the location.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
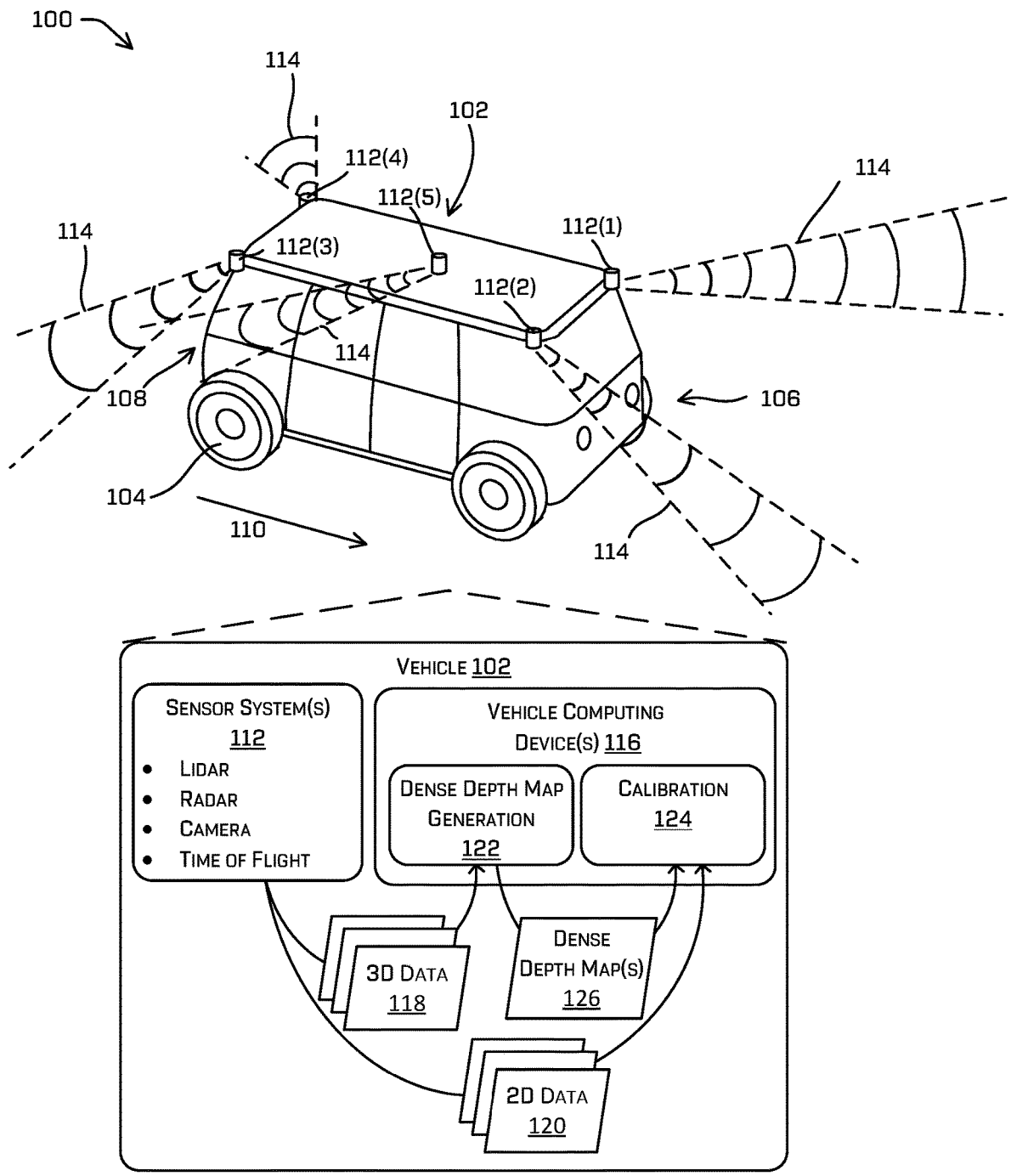
FIG. 1 is a schematic representation of an example system for calibrating a plurality of sensors mounted on an autonomous vehicle, in accordance with implementations described herein.

Techniques described herein are directed to calibrating an array of sensors without infrastructure, e.g., without fiducial markers, calibration boards, etc. In general, such calibration will refer to "extrinsic" calibration (that is determining a relative position and/or orientation of the sensors comprising the array of sensors.). Throughout the specification, an example of such a system is an autonomous vehicle having multiple sensors (of the same or different modalities), though other systems are contemplated (e.g. smartphones having multiple image sensors, robotic manipulators having various sensor modalities, or the like). In one such example (i.e. where the system is an autonomous vehicle), the autonomous vehicle can include multiple sensors (of the same or different modalities), which can represent overlapping fields of view. A first sensor, e.g., a first LiDAR sensor, can capture first data, e.g., a point cloud, of an environment and a second sensor, e.g., a second LiDAR sensor or a camera, can capture second data, of the environment. When the first and second sensors are correctly calibrated, the first data and the second data, when represented in the same two-dimensional space, e.g., a camera space, produce an aligned representation of the environment. However, when the sensors are improperly calibrated, the sensor data may result in an inaccurate, or "blurry," representation of the environment. In a real-world example, as applied to autonomous vehicles and as an illustration of the need for a highly accurate calibration, a misalignment of sensors on the order of 0.5-degrees may result in an inability to determine with certainty a lane in which an object 100 meters away is travelling. When calibrated manually, however, physical tolerances of the vehicle, sensors, and mounts may only provide a positional tolerance with certainty on the order of about 2.0 degrees. Accordingly, sensors have the potential to be misaligned upon installation.

Techniques have been developed to calibrate sensor arrays. For example, and as noted above, some conventional techniques require the use of fiducials for calibration. Moreover, U.S. patent application Ser. No. 16/023,571, "Sensor Calibration," filed Jun. 29, 2018 and Ser. No. 16/023,507, "Infrastructure Free Intrinsic Calibration," filed Jun. 29, 2018, which are hereby incorporated by reference, describe techniques related to infrastructure-free calibration of sensors. However, conventional techniques are often time consuming, e.g., taking on the order of hours, and thus may be performed only when the vehicle is out of service. In practice, however, sensors can become misaligned at any time, e.g., during normal driving conditions. Such misalignment is generally only discovered (and corrected) when the conventional calibration techniques are carried out. Improperly relying on an incorrect calibration while driving can create hazardous conditions, such as those described above.

In examples described herein, however, calibration techniques can be used to identify improper calibration of an array of sensors, including but not limited to cameras, LiDAR sensors, time-of-flight sensors, radar sensors, or the like, mounted on a vehicle, relatively quickly. Moreover, techniques described herein can determine calibration functions for correcting these improper calibrations. In some such examples, calibration may be performed on the order of minutes, or even seconds to subseconds, far reducing the probability of an incident incurred through the use of improper calibration.

In some implementations, the techniques described herein can be applied to a sensor array comprising one or more sensors, of the same or different modalities, mounted to capture data covering the 360-degrees around an autonomous vehicle. For example, a plurality of cameras, with overlapping fields of view, may be mounted to image 360-degrees around the vehicle. In addition, one or more LiDAR sensors may be mounted to capture point-cloud data, e.g., depth and intensity values for the 360-degrees around the vehicle.

The calibration techniques described herein can include generating a dense depth map, in a two-dimensional camera space, from sparse point cloud data generated by a first sensor in the array, such as a LiDAR sensor. In some examples, techniques can include generating a mesh from the point cloud and projecting the mesh into the two-dimensional camera space to generate the dense depth map. For example, the mesh may be a connectivity graph including geometric shapes, e.g., triangles, having vertices corresponding to points in the point cloud data. For instance, the mesh may be generated by triangulating the points in the point cloud, e.g., using Delaunay triangulation. In some examples, individual triangles comprising the mesh may be planar segments that are co-planar with each of the vertices. The dense depth map may include a depth value at each pixel in the two-dimensional camera space, and the depth values are determined based on the mesh. For example, pixels corresponding to points in the point cloud may have a depth corresponding to the measured value at the point, whereas other pixels, e.g., pixels spaced form points in the point cloud, may have a depth determined by the mesh, e.g., corresponding to an interpolation between measured points.

In some implementations, the techniques described herein can determine differences between the dense depth map and image data from a second sensor having a field of view that overlaps with the field of view of the first sensor. For example, when the second image data is a second point cloud, e.g., from a second LiDAR sensor, a second dense depth map can be generated in the two-dimensional camera space, e.g., by projecting a second mesh fitted to the second point cloud into the two-dimensional camera space. When the first and second sensors are properly aligned, a depth value in the first depth map will equal a corresponding depth value in the second depth map. A difference in these depths, however, represents an alignment, or calibration, error. In some implementations, the depth map can instead, or in addition, represent intensities in the two-dimensional space and differences in these intensities can also be used to determine misalignment. For example, intensity values associated with the lidar returns used to create a mesh (and corresponding depth map) can be used to generate an intensity image (e.g., an image corresponding to the lidar intensity as observed from a camera (whether virtual or not)). In still further implementations, surface normal associated with the respective dense depth maps may be compared.

When the second image data is two-dimensional image data, e.g., when the second sensor is a camera, the second image data can be transferred to the two-dimensional camera space (or the dense depth map can be generated in the sensor's camera space). In that space, techniques descried herein can detect edges in the second image data and compare those edges to depth discontinuities in the dense depth map. When the first and second sensors are properly aligned, edges detected in the image from the camera will align with the depth discontinuities in the dense depth map. When these features do not align, however, the sensors are not properly aligned.

Techniques described herein can also quantify a misalignment between two cameras with overlapping fields of view using a depth map. For example, a depth map generated using point cloud data, as described above may be used for projecting images into a common two-dimensional space, such that the images can be compared in that space (or otherwise transferred from one reference frame to the other). In some examples, first image data from a first camera can be projected onto a dense depth map generated using sensor data from a sensor, e.g., a LiDAR sensor, having a field of view overlapping with the field of view of the first camera. Similarly, second image data from a second camera can be projected onto the dense depth map to "align" the first and second image data in the two-dimensional space. Differences between the two projected images, e.g., distances between features such as edges, can be determined in the two-dimensional space. Similarly, such alignment can be performed in either reference frame of the images when transferred.

Accordingly, techniques can identify and quantify, e.g., as a calibration error, these differences between the data from the sensors. In some instances, if the calibration error is above a threshold error, the sensor array may be deemed unreliable. In such instances, the vehicle can be removed from service until the calibration is corrected. In other implementations, techniques described herein can generate a calibration function, e.g., that reduces, e.g., minimizes, the calibration error. For example, the calibration function generated according to techniques described herein may be sufficient to refine data as it is collected, e.g., during operation at real- or near-real time.

Calibration techniques discussed herein can improve the functioning of a computing device by providing a framework to determine optimal calibration for sensors, e.g., an array of sensors, on an autonomous vehicle. By calibrating one or more sensors using the calibration techniques described herein, the sensors can generate data representing an environment with a high degree of accuracy and precision about the environment. For example, sensors that have been calibrated in this manner can provide more accurate data for segmentation, classification, route planning, etc., which can ultimately lead to better safety outcomes while driving. Furthermore, such improved calibration for sensors may improve processing and perception systems, for example, by providing more accurate starting points and better fused data for segmentation, classification, etc. These and other improvements to the functioning of a computing device are discussed.

The calibration techniques discussed herein also represent improvements over conventional calibration. For example, in the past, calibration techniques often required fiducial markers or other infrastructure. For example, some techniques have included mounting a vehicle on a turntable and physically turning the vehicle while monitoring the data captured by sensors on the vehicle. Other systems required human operators to wave such fiducials in the sensors of such vehicles. Such conventional calibration techniques suffer from limited flexibility, often require additional and/or specialized calibration equipment, and/or result in a suboptimal calibration process. In contrast, the techniques described herein may allow for infrastructure-free calibration. For example, techniques described herein may be able to automatically adjust for changes in calibration as a vehicle traverses through an environment, e.g., by considering new data as it is recorded. Moreover, because the techniques described may not require movement of the vehicle, e.g., pose may not be required to calibrate sensors as described herein, calibration may be accomplished prior to operation of the vehicle, e.g., at powering up. Moreover, the techniques described herein may feature reduced computing time relative to other sensor calibration techniques. For example, calibration of many or all sensors on the vehicle, including sensors of different modalities, can be accomplished in minutes, often in less than 30 minutes, compared to conventional techniques that could take hours. For at least the foregoing reasons, the techniques discussed herein represent significant improvement over conventional calibration.

The methods, apparatuses and systems described herein can be implemented in a number of ways. Example implementations are provided below with reference to the following figures. Although discussed in the context of an autonomous vehicle, the methods, apparatuses, and systems described herein can be applied to a variety of systems requiring calibration of sensors prior to and/or during use, and are not limited to autonomous vehicles. In other examples, the methods, apparatuses, and systems may be utilized to calibrate sensors on airborne, water-borne, and/or robotic devices that include multiple sensors. Additionally, the techniques described herein may be used with real data (e.g., captured using one or more sensors), simulated data (e.g., generated by a simulator) or any combination of the two.

FIG. 1 is a schematic diagram of an example environment 100 through which an example vehicle 102 travels. For the purpose of illustration, the vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In that case, since the vehicle 102 may be configured to control all functions from start to completion of the trip, including all parking functions, it may not include a driver. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 shown in FIG. 1 is an automobile having four wheels 104. Other types and configurations of vehicles are contemplated, such as, for example, vans, sport utility vehicles, cross-over vehicles, trucks, buses, agricultural vehicles, and construction vehicles. The vehicle 102 may be powered by one or more internal combustion engines, one or more electric motors, hydrogen power, any combination thereof, and/or any other suitable power sources. In addition, although the example vehicle 102 has four wheels, the systems and methods described herein may be incorporated into vehicles having fewer or a greater number of wheels, tires, and/or tracks. The example vehicle 102 may have four-wheel steering and may operate generally with equal performance characteristics in all directions. For example, the vehicle 102 may be a bi-directional vehicle, such that either of a first end 106 or a second end 108 of the vehicle 102 may be the front end of the vehicle 102, depending on the direction of travel of the vehicle 102. In the example embodiment, the vehicle 102 may be travelling generally in a first direction 110, such that the first end 106 of the vehicle is the leading or "front" end.

The vehicle 102 can also include an array of sensor systems 112, which may include RADAR sensors, LiDAR sensors, SONAR sensors, time of flight sensors, image sensors, e.g., cameras, or any combination thereof, mounted on the vehicle 102. More specifically, the vehicle 102 is illustrated as including a plurality of sensor systems 112(1), 112(2), 112(3), 112(4) arranged at corners of the vehicle 102 and a sensor assembly 112(5). (Hereinafter, the sensor systems 112(1), 112(2), 112(3), 112(4), 112(5) may be referred to, collectively, as the sensor systems 112.) For purposes of illustration, a field of view 114 is associated with each of the sensor systems 112. The sensor systems 112 may be mounted to a portion of the vehicle 102 that provides a line-of-site view of a portion of the environment around the vehicle 102, with at least a portion of the sensor systems 112 having a field of view generally aligned with the direction of travel. The sensor systems 112 may be arranged in a predetermined pattern or configuration, for example, in order to provide a desired area of coverage of an environment of the vehicle. In some instances, the sensor systems 112 may be arranged in a pattern that enables the fields of view 114 associated with the sensor systems 112 (or associated with sensors comprising the sensor systems 112) to provide 360-degrees of sensing around the vehicle 102. Accordingly, the sensor systems 112 may enable the vehicle 102 to detect objects regardless of the direction of travel of the vehicle 102. This arrangement may also enable the system vehicle 102 to detect objects approaching from the sides of the vehicle 102 (e.g., a dog, or other animal, running into the street) and/or from behind (e.g., an emergency vehicle).

The illustrated fields of view 114 are for example only. In some instances, the illustrated fields of view associated with one or more of the sensor systems 112(1), 112(2), 112(3), 112(4) may be substantially wider than illustrated. For example, each field of view 114 may provide at least 90-degrees of coverage when only four sensor assemblies are provided, as in the example. Additional sensors may also be provided in other implementations, including but not limited to a speed sensor, sensors related to operation of internal combustion engines and/or electric motors, sensors related to the tires to detect tire temperature, tire pressure, and tread depth, and/or brake-related sensors for detecting brake temperatures and/or wear, and in vehicles having regenerative braking, sensors for detecting parameters related to operation of the regenerative braking system. The vehicle sensors may also include, for example, inertial measurement units (IMUs), accelerometers, and gyroscopes.

According to some examples, one or more of the sensors may be mounted in a fixed manner, for example, so that data captured from the sensors are captured from a constant orientation relative to the vehicle 102. In such examples, the data may always be captured from the same angle relative to the vehicle 102 in both the vertical and lateral directions. In other implementations, sensors associated with the sensor systems 102 may oscillate or rotate to provide a greater field of coverage. For example, the sensor system 112(5) may include a rotating, oscillating-type, or solid-state LiDAR sensor that may be arranged to sweep or scan a full 360-degrees around the vehicle 102. Other patterns and arrangements of the sensor systems 112 are contemplated. The vehicle 102 may also include any number and type of sensors and is not limited to the illustrated examples and configurations. For instance, although the example sensor systems 112 shown are mounted to the roof of the vehicle, one or more sensors can be mounted to other portions of the vehicle 102. For example, one or more sensors can be mounted to the first end 106 and/or the second end 108 of the vehicle 102, for example, at a location generally corresponding to the location of a bumper of a conventional car.

In the illustrated example, the sensor systems 112(1), 112(2), 112(3), 112(4) may include one or more of a LiDAR sensor, a time of flight sensor, an IMU sensor, a radar sensor, and/or a camera, and the sensor system 112(5) may include a LiDAR sensor. During operation, e.g., autonomous operation, of the vehicle 102, data from the sensor systems 112 may be used to navigate mapped regions. For example, sensor data from the sensor systems 112 may be used by one or more of a localization component, a perception component and/or a planning component, e.g., to determine a position of the vehicle 102 in the mapped region, identify objects in the environment, and/or determine one or more trajectories through the mapped region.

Because successful operation of the vehicle 102 depends on accurate sensor data, alignment of the sensor systems 112, e.g., with each other and/or with a reference, such as the vehicle, is necessary. For instance, images of the same object in the environment 100 captured by cameras having overlapping fields of view should align, e.g., after a transformation function that accounts for a translation and/or rotation between the cameras. Similarly, image data from cameras should correspond to LiDAR data. For instance, feature edges in the image data should correspond to depth discontinuities in LiDAR data. Confirming alignment of the sensor system(s) 112 at regular intervals may be essential, especially since misalignment can result from external factors, including those acting on the sensor system(s) 112 through regular driving. As noted above, conventional calibration of multiple sensors can be time consuming, computationally expensive, and/or require fiducials. On the other hand, techniques described herein are useful in identifying and/or correcting for misalignment. More specifically, techniques described herein can use sensor data to determine whether the sensor systems 112 are properly aligned more quickly, with less computation, and/or without infrastructure. The techniques described herein can also measure and correct for misalignment between different sensor modalities, e.g., a LiDAR sensor and a camera.

In some examples, techniques described herein may render three-dimensional data, e.g., a point cloud generated by a LiDAR sensor, as a two-dimensional function, for comparison to two-dimensional image data. For instance, by comparing the three-dimensional data to two-dimensional data using the techniques described herein, calibration errors, e.g., caused by misalignment of sensors, can be identified across different sensor modalities. In some implementations, the techniques described herein can provide a fast validation step, e.g., by demonstrating that cameras are calibrated within a threshold. In still further examples, the techniques described herein can identify when cameras are outside of a threshold error tolerance, and appropriate action, e.g., additional calibration or re-calibration, can be undertaken.

To implement these techniques, and as illustrated in FIG. 1, the vehicle 102 can include one or more vehicle computing devices 116 configured to receive sensor data, including three-dimensional data 118, e.g., point clouds from one or more LiDAR sensors, and/or two-dimensional data 120, e.g., images from one or more cameras (RGB, intensity, etc.). Although examples are described with reference to LiDAR sensors (as sensors that generate the three-dimensional data 118) and cameras (as sensors that generate two-dimensional data), other sensors also can be used in implementations described herein. As will be appreciated from this disclosure, techniques described herein may render all different types of image data as two-dimensional functions in a common space, e.g., a two-dimensional camera space, and determine differences in those functions.

The vehicle computing device(s) 116 may include a dense depth map generation component 122, which may be separate from, or comprise a part of a calibration component 124. In some examples, the dense depth map generation component 122 can generate a two-dimensional representation of the three-dimensional data 118, e.g., a point cloud, received from one of the sensor system(s) 112. For example, the dense depth map generation component 122 can receive or otherwise access point cloud data, e.g., a sparse point cloud, generated by a LiDAR sensor, fit a mesh to the sparse point cloud, and project the mesh into a two-dimensional space, e.g., a camera space, to create a dense depth map 126. In embodiments described herein, the dense depth map generation component 122 can generate the mesh as a triangulation, such as a Delaunay triangulation, of the points in the point cloud. The dense depth map generation component 122 can also project the mesh into a two-dimensional space, such as a camera space, as the dense depth map 126. For example, while the point cloud has a limited number of points, the dense depth map 126 will have an associated depth for each pixel in the camera space, e.g., an actual measured depth at locations corresponding to points in the point cloud or an interpolated depth at locations between points in the point cloud.

The calibration component 124 can determine whether sensors are aligned based on differences between the dense depth map and other image data captured by another sensor. For example, by projecting or otherwise considering other image data in the same camera space as that in which the dense depth map is projected, misalignment between features or parameters of objects in the environment can be determined. In one example, the calibration component 114 can determine a misalignment between two LiDAR sensors. For example, and similar to techniques just described, the dense depth map generation component 122 can receive point clouds from two LiDAR sensors having overlapping fields of view and generate two dense depth maps, i.e., one corresponding to each point cloud, in the same camera space. The camera space may be an actual camera space or a theoretical camera space. Techniques described herein may assume that all objects are sufficiently far from the sensors that parallax associated with the sensors is negligible, and thus, in this example, the dense depth maps should align in areas in which the fields of view of the LiDAR sensors overlap. That is, on a pixel-by-pixel basis in the camera space, a depth associated with the first dense depth map should be equal to a depth associated with the second depth map. Differences between the two, e.g., errors, may be indicative of misalignment between the two LiDAR sensors. In implementations described herein, the calibration component 124 can determine these errors, and operation of the vehicle 102 may be determined based at least in part on the errors. For example, when the error is equal to or above a threshold error, the vehicle may be deemed unsafe for operation, for example, and/or unsafe for operation above a certain speed.

In some implementations, the calibration component 124 can also determine a calibration function based on the errors. In the example of two LiDAR sensors just described, the calibration component 124 can run an optimization on the two dense depth maps 126, and determine a correction function, e.g., a translation and/or rotation that would rectify the orientation differences.

Techniques descried herein also can be useful to calibrate sensors other than LiDAR sensors. In another example, the three-dimensional data 118, e.g., a LiDAR point cloud, can be calibrated to a two-dimensional sensor, e.g., a camera. For instance, and as described above, the three-dimensional data 118, e.g., the point cloud, can be used to generate a dense depth map 126, which can be compared to the two-dimensional image data 120. For example, by projecting the two-dimensional image data into the same camera space in which the dense depth map is rendered, the calibration component 124 can compare the two data types and determine differences. For instance, the calibration component 124 can identify edges in the two-dimensional image data and identify depth discontinuities in the depth map 126. The edges and discontinuities should align, and the calibration component 124 can identify when they do not, and quantify an error, e.g., based on a distance between two features.

As noted above, the techniques described herein can provide a relatively quick confirmation that sensors are properly aligned. By projecting the image data into a same two-dimensional camera space, any misalignment may be attributed to an orientation of the sensors relative to each other, e.g., because the positions are fixed. Moreover, the techniques described herein assume that all sensors are aligned at the same point (or that all measurements are made at infinity) and thus ignore any parallax between the sensors.

Figure 2:
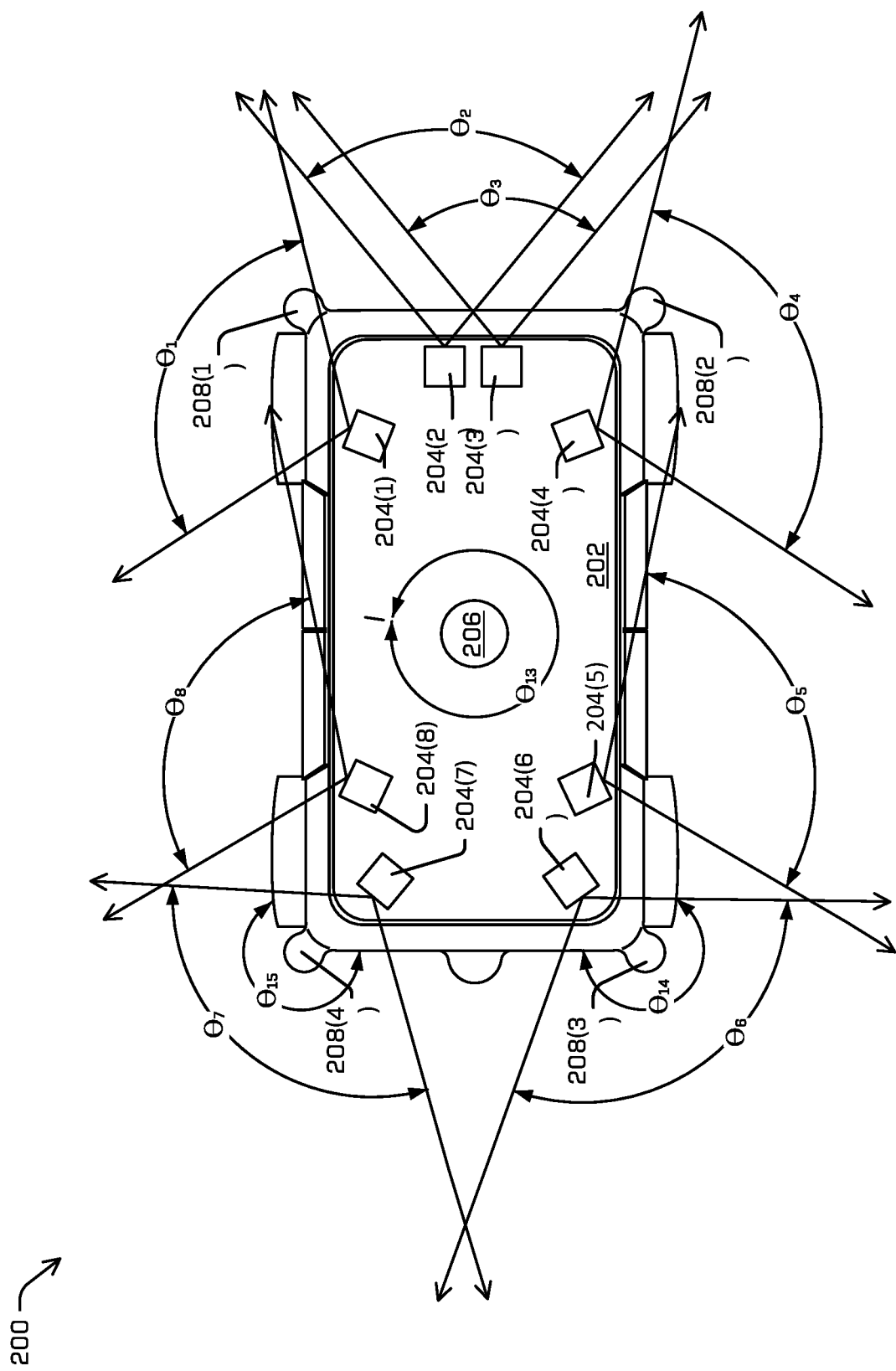
FIG. 2 is a top plan view of an example vehicle illustrating multiple sensors mounted on the vehicle.

FIG. 2 illustrates an example top view 200 of an autonomous vehicle 202 that may be used in examples of this disclosure. The vehicle 202 may be substantially the same as the vehicle 102 described above. As detailed in FIG. 2, the vehicle 202 includes eight cameras 204(1), 204(2), 204(3), 204(4), 204(5), 204(6), 204(7), 204(8) (collectively, the cameras 204) mounted on a roof of the vehicle 202. The camera 204(1) may include a horizontal field of view $\Theta 1$, the camera 204(2) may include a horizontal field of view $\Theta 2$, the camera 204(3) may include a horizontal field of view $\Theta 3$, the camera 204(4) may include a horizontal field of view $\Theta 4$, the camera 204(5) may include a horizontal field of view $\Theta 5$, the camera 204(6) may include a horizontal field of view $\Theta 6$, the camera 204(7) may include a horizontal field of view $\Theta 7$, and the camera 204(8) may include a horizontal field of view Os. As configured, the cameras 204 are disposed at mounting locations such that adjacent cameras have overlapping fields of view, and in the aggregate the cameras 204 provide a full 360-degrees of vision about the vehicle 202.

As also illustrated in FIG. 2, the vehicle 202 also includes additional sensor assemblies or systems. In some instances, the sensor assemblies may include, but are not limited to, one or more LiDAR sensors, radar sensors, image sensors, SONAR sensors, time-of-flight sensors, and the like. In the example, the vehicle 202 may also include sensors 206, 208(1), 208(2), 208(3), 208(4) (with the sensors 208(1), 208(2), 208(3), 208(4) collectively referred to as the sensors 208). The sensor 206 may include a LiDAR sensor mounted on the roof of the vehicle 202 and can include a field of view $\Theta 13$. Similarly, the sensors 208 may have a horizontal field of view. For example, the sensor 208(3) is illustrated as including a field of view $\Theta 14$ and the sensor 208(4) includes a field of view $\Theta 15$. (The fields of view associated with sensors 208(1), 208(2) are omitted from the Figure, for clarity.)

As discussed in more detail herein, the sensor 206 and/or the sensors 208 may be sensors, such as LiDAR sensors, time-of-flight sensors, or the like, that generate three-dimensional data (e.g., point cloud data). Such three-dimensional data may be sparse, but techniques described herein can use the sparse data to generate a dense depth map, e.g., by fitting a mesh to the point cloud and projecting the mesh into a two-dimensional space. The dense depth map may then be compared, in the two-dimensional space, to image data captured by the cameras 204 and/or other of the sensors 206, 208 to determine alignment errors. As may be understood in the context of this disclosure, the sensor modalities, mounting locations, fields of view and/or other features are for illustrative purposes only. Any number and/or type of sensors can be mounted to or installed in the vehicle 202.

As illustrated, the sensor 206 may have a 360-degree field of view, overlapping with the fields of view of the cameras 204 and the field of view of the sensors 208 may also overlap with each other, with the fields of view of the cameras 204, and/or with the field of view of the sensor 206. Because of this arrangement of the cameras 204, sensor 206, and sensors 208, techniques described herein can be applied across the entire array of sensor systems (e.g., to determine a relative alignment of all cameras 204 and sensors 206, 208). More specifically, each camera's field of view overlaps with at least one additional camera's field of view and with the field of view of at least one of the sensors 206, 208 generating three-dimensional data. As a result, any two cameras 204 and/or sensors 206, 208 can be calibrated relative to each other, e.g., by projecting image data/dense depth maps onto a shared two-dimensional space, and therefore all cameras and sensors can be calibrated relative to each other.

As noted above, the techniques described can operate relatively quickly, e.g., on the order of a minute or less, to provide a baseline understanding of whether the sensor systems are relatively well aligned. For example, when an alignment error above a threshold error is determined, the vehicle may be controlled to prohibit or limit controls of the vehicle. Moreover, in some implementations, the techniques described herein may be used to determine a calibration function for the cameras relative to some theoretical point, e.g., a point on a central axis of the vehicle. Accordingly, newly-acquired sensor data may be corrected using the calibration function, e.g., to correct for the misalignment, generally in real-time or near-real time. As may be understood, the example arrangement of cameras 204 and sensors 206, 208 is but one example; more or fewer cameras and/or sensors with the similar or different arrangements may also benefit from techniques described herein. Moreover, although the top view 200 illustrates only horizontal fields of view, it may be understood that each of the cameras 204 and/or the sensors 206, 208 also has a vertical field of view, and as described above, the techniques described herein can be used to account for misalignment in a two-dimensional space. Furthermore, although the cameras 204 are illustrated as being substantially identical, the cameras may be different types, e.g., with different shutter types, lens types, fields of view, or the like.

Figure 3:
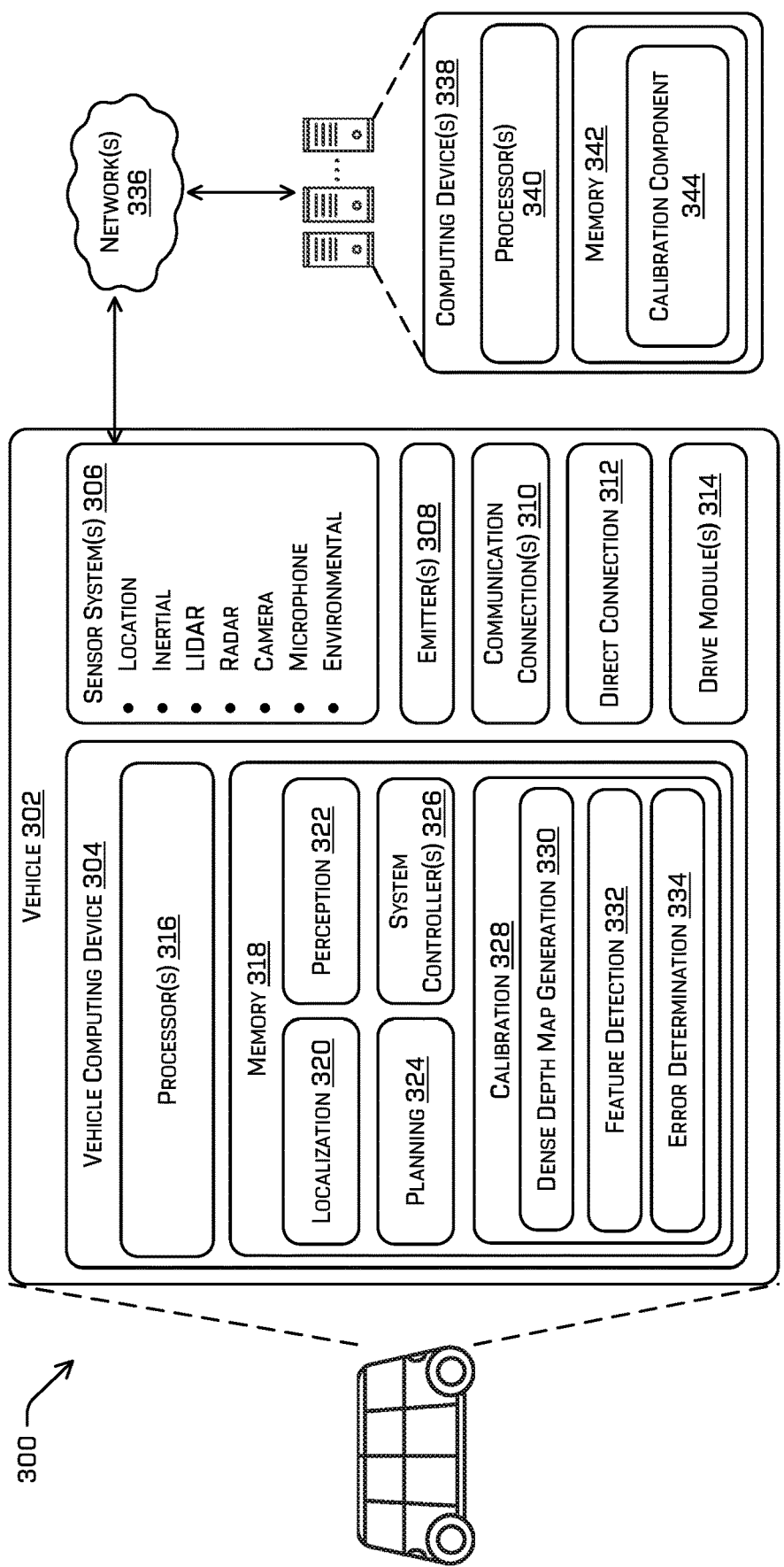
FIG. 3 is a block diagram of an example system for implementing embodiments of sensor calibration, in accordance with implementations described herein.

FIG. 3 illustrates a block diagram of an example system 300 for implementing the techniques described herein. In at least one example, the system 300 can include a vehicle 302, which can be the same vehicle as the vehicle 102 or the vehicle 202 described above with reference to FIGS. 1 and 2, respectively.

The vehicle 302 can include a vehicle computing device 304, one or more sensor systems 306, one or more emitters 308, one or more communication connections 310, at least one direct connection 312, and one or more drive modules 314.

The vehicle computing device 304 can include one or more processors 316 and memory 318 communicatively coupled with the one or more processors 316. In the illustrated example, the vehicle 302 is an autonomous vehicle; however, the vehicle 302 can be any other type of vehicle. In the illustrated example, the memory 318 of the vehicle computing device 304 stores a localization component 320, a perception component 322, a planning component 324, one or more system controllers 326, and a calibration component 328. Further, the calibration component 328 can include a dense depth map generation component 330, a feature detection component 332, and an error determination component 334. Though depicted in FIG. 3 as residing in memory 318 for illustrative purposes, it is contemplated that the calibration component 328 may additionally, or alternatively, be accessible to the vehicle 302 (e.g., stored remotely). Moreover, although the dense depth map generation component 330, the edge detection 332, and the feature matching component 334 are illustrated as being a portion of the calibration component 328, some or all of those components may be separate from the calibration component 328 and/or functionality ascribed to those components may be performed by other components, either on the vehicle 302 or remote from the vehicle 302.

In at least one example, the localization component 320 can include functionality to receive data from the sensor system(s) 306 to determine a position of the vehicle 302. For example, the localization component 320 can include, request, and/or receive a three-dimensional map of an environment and can continuously determine a location of the autonomous vehicle within the map. In some instances, the localization component 320 can utilize SLAM (simultaneous localization and mapping) or CLAMS (calibration, localization and mapping, simultaneously) to receive image data, LiDAR data, radar data, SONAR data, IMU data, GPS data, wheel encoder data, and/or the like to accurately determine a location of the autonomous vehicle 302. In some instances, the localization component 320 can provide data to various components of the vehicle 302 to determine an initial position of the vehicle 302 for generating a candidate trajectory, or for correlating calibration operations, as discussed herein.

In some instances, the perception component 322 can include functionality to perform object detection, segmentation, and/or classification. In some examples, the perception component 322 can provide processed sensor data that indicates a presence of an entity that is proximate to the vehicle 302 and/or a classification of the entity as an entity type (e.g., car, pedestrian, cyclist, animal, unknown, etc.). In additional and/or alternative examples, the perception component 322 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (e.g., size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 324 can determine a path for the vehicle 302 to follow to traverse through an environment. For example, the planning component 324 can determine various routes and trajectories and various levels of detail. The planning component 324 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 324 can generate an instruction for guiding the autonomous vehicle along at least a portion of the route from the first location to the second location. In at least one example, the planning component 324 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique.

In at least one example, the vehicle computing device 304 can include the one or more system controllers 326, which can be configured to control steering, propulsion, braking, safety, emitter, communication, and other systems of the vehicle 302. The system controller(s) 326 can communicate with and/or control corresponding systems of the drive module(s) 314 and/or other components of the vehicle 302.

In general, the calibration component 328 can include functionality to identify miscalibration and/or calibrate one or more sensors, e.g., the sensor systems 306, operating in connection with the vehicle 302. For example, the calibration component 328 can detect improperly calibrated sensors, schedule calibration routines, and send calibration data to one or more other components of the vehicle 302 that utilize data produced by the one or more sensors. In some instances, the calibration component 328 can generate information indicative of improperly calibrated or misaligned sensors, and send the information to the system controller(s) 326 to prohibit or limit operation of the vehicle, e.g., to avoid unsafe operation.

The dense depth map generation component 330 can receive three-dimensional data, e.g., a point cloud from a LiDAR sensor, and generate a two-dimensional, dense map of the three-dimensional data. For example, the dense depth map generation component 330 can apply a triangulation operation to the sparse point cloud data to create a mesh. For example, the dense depth map generation component 330 can apply a Delaunay triangulation to the point cloud to generate a triangulated mesh. In other instances, other triangulations and/or geometrical mesh generation techniques may be used.

The dense depth map generation component 330 can also generate a dense depth map in a two-dimensional space, e.g., a two-dimensional camera space. For instance, the dense depth map generation component can project the generated mesh into the two-dimensional space. In some examples, the two-dimensional space may a theoretical or virtual camera space. However, in other examples, the two-dimensional space may be a camera space of a camera or other imaging sensor mounted on the vehicle, e.g., one of the sensor systems 306. When the two-dimensional space is associated with an existing camera, the dense depth map may be rendered in the camera's parameter space, e.g., taking into account the position, orientation, distortion parameters, and/or the like, of the specific camera.

The dense depth map generally provides a two-dimensional function representative of the three-dimensional data. For example, the dense depth map may provide, for each pixel or location in the two-dimensional space, a depth measurement. In some embodiments, when the pixel or location corresponds to a location of one of the points in the point cloud, i.e., a point in the environment sensed by the sensor, the depth value may the depth at the point in the point cloud, e.g., the depth measured by the sensor. Also in this example, pixels or locations that do not correspond to points in the point cloud, i.e., locations not sensed directly by the sensor, have a depth value that is interpolated using the mesh. In some examples, each "triangle" or segment of the mesh may be treated as a planar surface in which each of the three vertices of the segment lies. The depth values are then determined based on the position on the plane. Other interpolation techniques may also be used. However, using a planar mesh as just described may provide additional information about the image data. For instance, surface normals for each of the segments of the mesh can also be determined. As will be appreciated, because the environment of a vehicle may contain many generally planar structures, e.g., road signs, the driving surface, or the like, comparing surface normal may also be used as a clue for misalignment. That is, when two dense depth maps representative of sensor data from two different sensors as rendered into a same camera (which may be a virtual camera) are compared, depth should be substantially similar, planar surfaces should align, and the difference between surface normals can provide information about sensor calibration when they do not align.

In examples described herein, the dense depth map can be used to determine a depth of a surface at any point in a two-dimensional image space. However, a similar mapping may also be used to determine intensities of surfaces in each LiDAR sensor in the image space. For example, LiDAR data includes, for each point in a point cloud, depth and intensity information. In some examples, the dense depth map generation component 220 can likewise determine an intensity for any point in the two-dimensional space (e.g., by mapping intensity information from three-dimensions into two-dimensions on the image plane). Thus, for example, instead of using the mesh geometry to interpolate depths, aspects of this disclosure can interpolate intensity values using the geometry of the mesh. Intensity values can be another or an alternative measurement used to compare the dense depth map to other two-dimensional image data.

The feature detection component 332 can analyze sensor data to determine features in the data. For example, the feature detection component 332 can determine edges in an image. In some instances, the feature detection component can apply a Canny edge detection algorithm (or otherwise) to detect edges in images captured by cameras or other 2D imaging sensors mounted on the vehicle 302. In other examples, the feature detection component 332 can determine image gradient magnitudes in the image data. In some examples, edge detection may require discretization of the image, whereas image gradient magnitudes can be done on a continuous space, but with similar effect. In those examples where a gradient it used, comparisons may be made between all pixels, pixels having a sufficiently high gradient (e.g., meeting or exceeding a threshold), or the like. The feature detection component 332 may also identify depth discontinuities in a dense depth map generated by the dense depth map generation component 330. Surface normals, e.g., rays normal to planar surfaces, may be used to identify such depth discontinuities. For example, in implementations described herein, edges and/or image gradient magnitude variations determined by the feature detection component can be compared to the depth discontinuities apparent from the dense depth map to obtain calibration information, e.g., errors caused by misalignment of the camera and the 3D imaging sensor. In at least some examples, calibration errors may be determined based on distances in image space (e.g., Euclidian distances in pixels) between image discontinuities and depth discontinuities projected into image space. Of course, the feature detection component 332 may determine various other image and/or lidar based features, such as, but not limited to, AKAZE, ORB, BRIEF, FAST, SURF, SIFT, embeddings trained by a machine learning model, and the like.

The error determination component 334 can include functionality to determine a misalignment of sensors in the sensor system. For example, the error determination component 334 can quantify sensor misalignment. In examples described herein in which two three-dimensional sensors, e.g., a first sensor and a second sensor, are to be calibrated, the error determination component 336 can determine a difference between parameters of a first dense depth map (representative of sensor data from the first sensor) and corresponding parameters of a second dense depth map (representative of the sensor data form the second sensor), where the first and second depth maps are rendered in the same two-dimensional camera space. Such differences may include, for example, a difference in depth values (e.g., a difference in depth between the depth maps on a pixel-by-pixel basis), a difference in intensity values, and/or a distance between depth discontinuities. In other examples of the case of two three-dimensional sensors, the error determination component 334 may determine a difference, e.g., an angular distance, between surface normals in the two dense depth maps.

In examples in which a three-dimensional sensor (e.g., a LiDAR sensor) and a two-dimensional image sensor (e.g., a camera) are to be calibrated, the error determination component 332 can determine distances between depth discontinuities in the three-dimensional data, e.g., identified in the dense depth map corresponding to point cloud data generated by the three-dimensional sensor, and features, e.g., edges, detected by the feature detection component 332 in the image data generated by the camera and rendered on the depth map. In implementations in which two cameras are to be calibrated, the error determination component 332 can determine distances between features, e.g., edges, detected by the feature detection component in two images rendered on depth maps, in the same two-dimensional space. Thus, for example, by projecting the two images onto dense depth maps and/or into the same two-dimensional space, the images should align. Accordingly, a distance between the same feature in the two images, e.g., a Euclidean distance in pixels, constitutes error in alignment (and/or calibration) of the two cameras.

In some instances, the calibration component 328 may determine a calibration function for the multiple sensors using, at least in part, an error function based on the errors calculated by the error determination component 334. For instance, the calibration component can determine the calibration function by optimizing (e.g., using a non-linear least-squares optimization) the error function, e.g., to minimize errors on a pixel-by-pixel basis across two or more sensors of the same or different modalities. The calibration component 328 may also weight errors at pixels. In some instances, errors can be weighted based on a relative position of the measured values in the dense depth map. For instance, values that are one non-planar surfaces in the dense depth map may be scaled down, or down-weighted, whereas values on planar surfaces may be more highly weighted. Similarly, values that fall on vertices of the mesh, i.e., values that correspond to sensor returns, may be more reliable than values spaced from the vertices. In some instances, a weighting factor may be weighted, e.g., linearly, based on their distance from a vertex. Thus, for example, a value at a pixel in a center of a triangular section of the mesh may be down-weighted relative to a value at a pixel at a vertex of the mesh. In some examples, weighting may correspond inversely with depth (e.g., a lower weight for a further distance).

In techniques described herein, the calibration component 328 can be configured to fix many parameters that affect calibration. For example, and as described herein, techniques described herein may assume that all objects in the environment are sufficiently far from the sensors, e.g., at infinity, that parallax is ignored. Thus, in examples described herein, the calibration component 328 may be assuming a fixed or known relative position of the cameras and determining only a calibration function for orienting the sensors relative to each other. In examples in which a sensor array provides 360-degree coverage around the vehicle with overlapping fields of view (as in FIG. 2), the calibration function may effectively describe rotations of the sensor data that align the images in a sphere at infinity. The calibration component 328 can ignore or otherwise not consider camera and/or sensor intrinsics. In some instances, when a depth map is projected into a camera space of an actual camera, the intrinsics of that camera can be applied to the projection, but such is not required.

In other examples, the calibration component 328 can consider additional constraints to determine the calibration function. Information about objects in the environment may be used to constrain the calibration function. For example, surface normals of detected surfaces may be used to identify certain features of the environment. When comparing two dense depth maps, surface normals are expected to align for planar surfaces, and thus can be used to inform calibration. In other examples, buildings or other large structures are generally constructed such that a surface normal on a dominant surface, e.g., a side of the building, should be perpendicular to gravity. In some examples, an IMU or other sensor may provide gravitational the vehicle 302 with information about a direction of gravity, and thus the surface normals of dominant surfaces should be perpendicular to that direction. Moreover, intensity information received from returns from retroreflectors may indicate planar surfaces, such as street signs, road markings, license plates, or the like. Such information may additionally or alternatively be used to identify (and in some instances constrain) planar surfaces.

In some instances, aspects of some or all of the components discussed herein may include any models, algorithms, and/or machine learning algorithms. For example, in some instances, the components in the memory 318 (and memory 342, discussed below) may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet30, ResNet101, VGG, DenseNet, PointNet, and the like.

In at least one example, the sensor system(s) 306 can include LiDAR sensors, radar sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 306 can include multiple instances of each of these or other types of sensors. For instance, the LiDAR sensors (and/or radar sensors) can include individual LiDAR sensors (or radar sensors) located at the corners, front, back, sides, and/or top of the vehicle 302. As another example, the camera sensors can include multiple cameras (such as the cameras 206) disposed at various locations about the exterior and/or interior of the vehicle 302. The sensor system(s) 306 can provide input to the vehicle computing device 304. Additionally, or alternatively, the sensor system(s) 306 can send sensor data, via one or more networks 336, to the one or more computing device(s) at a particular frequency, after a lapse of a predetermined period of time, in near real-time, etc.

The vehicle 302 can also include one or more emitters 308 for emitting light and/or sound. The emitters 308 in this example can include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 may also include exterior emitters. By way of example and not limitation, the exterior emitters in this example can include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 302 can also include one or more communication connection(s) 310 that enable communication between the vehicle 302 and one or more other local or remote computing device(s). For instance, the communication connection(s) 310 can facilitate communication with other local computing device(s) on the vehicle 302 and/or the drive module(s) 314. Also, the communication connection(s) 310 can allow the vehicle to communicate with other nearby computing device(s) (e.g., other nearby vehicles, traffic signals, etc.). The communications connection(s) 310 also enable the vehicle 302 to communicate with a remote teleoperations computing device or other remote services.

The communications connection(s) 310 can include physical and/or logical interfaces for connecting the vehicle computing device 304 to another computing device or a network, such as the network(s) 336. For example, the communications connection(s) 310 can enable Wi-Fi-based communication such as via frequencies defined by the IEEE 802.11 standards, short range wireless frequencies such as Bluetooth, cellular communication (e.g., 2G, 3G, 4G, 4G LTE, 3G, etc.) or any suitable wired or wireless communications protocol that enables the respective computing device to interface with the other computing device(s).

In at least one example, the vehicle 302 can include one or more drive modules 314. In some examples, the vehicle 302 can have a single drive module 314. In at least one example, if the vehicle 302 has multiple drive modules 314, individual drive modules 314 can be positioned on opposite ends of the vehicle 302 (e.g., the front and the rear, etc.). In at least one example, the drive module(s) 314 can include one or more sensor systems to detect conditions of the drive module(s) 314 and/or the surroundings of the vehicle 302. By way of example and not limitation, the sensor system(s) 306 can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LiDAR sensors, radar sensors, etc. Some sensors, such as the wheel encoders can be unique to the drive module(s) 314. In some cases, the sensor system(s) on the drive module(s) 314 can overlap or supplement corresponding systems of the vehicle 302 (e.g., sensor system(s) 306).

The drive module(s) 314 can include many of the vehicle systems, including a high voltage battery, a motor to propel the vehicle 302, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 314. Furthermore, the drive module(s) 314 also include one or more communication connection(s) that enable communication by the respective drive module with one or more other local or remote computing device(s).

The processor(s) 316 of the vehicle 302 can be any suitable processor capable of executing instructions to process data and perform operations as described herein. By way of example and not limitation, the processor(s) 316 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 318 is an example of non-transitory computer-readable media. The memory 318 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 3 is illustrated as a distributed system, in alternative examples, components of the vehicle 302 can be associated with remote computing devices accessible via the network(s) 336.

For example, the vehicle 302 can send sensor data to one or more computing device(s) 338, via the network(s) 336. In some examples, the vehicle 302 can send raw sensor data to the computing device(s) 338. In other examples, the vehicle 302 can send processed sensor data and/or representations of sensor data to the computing device(s) 338. In some examples, the vehicle 302 can send sensor data to the computing device(s) 338 at a particular frequency, after a lapse of a predetermined period of time, in near real-time, etc. In some cases, the vehicle 302 can send sensor data (raw or processed) to the computing device(s) 338 as one or more log files.

The computing device(s) 338 can receive the sensor data (raw or processed) and can perform calibration operations on the data. In at least one example, the computing device(s) 338 can include one or more processors 340 and memory 342 communicatively coupled with the one or more processors 340. In the illustrated example, the memory 342 of the computing device(s) 338 stores a calibration component 344, which can include functionality to perform operations similar to those discussed above in the context of the calibration component 328. In some instances, the processor(s) 340 and the memory 342 can include functionality and/or structure similar to that discussed above with respect to the processor(s) 316 and the memory 318.

FIGS. 4-7 illustrate example processes in accordance with embodiments of the disclosure. These processes are illustrated as logical flow graphs, representing a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 4:
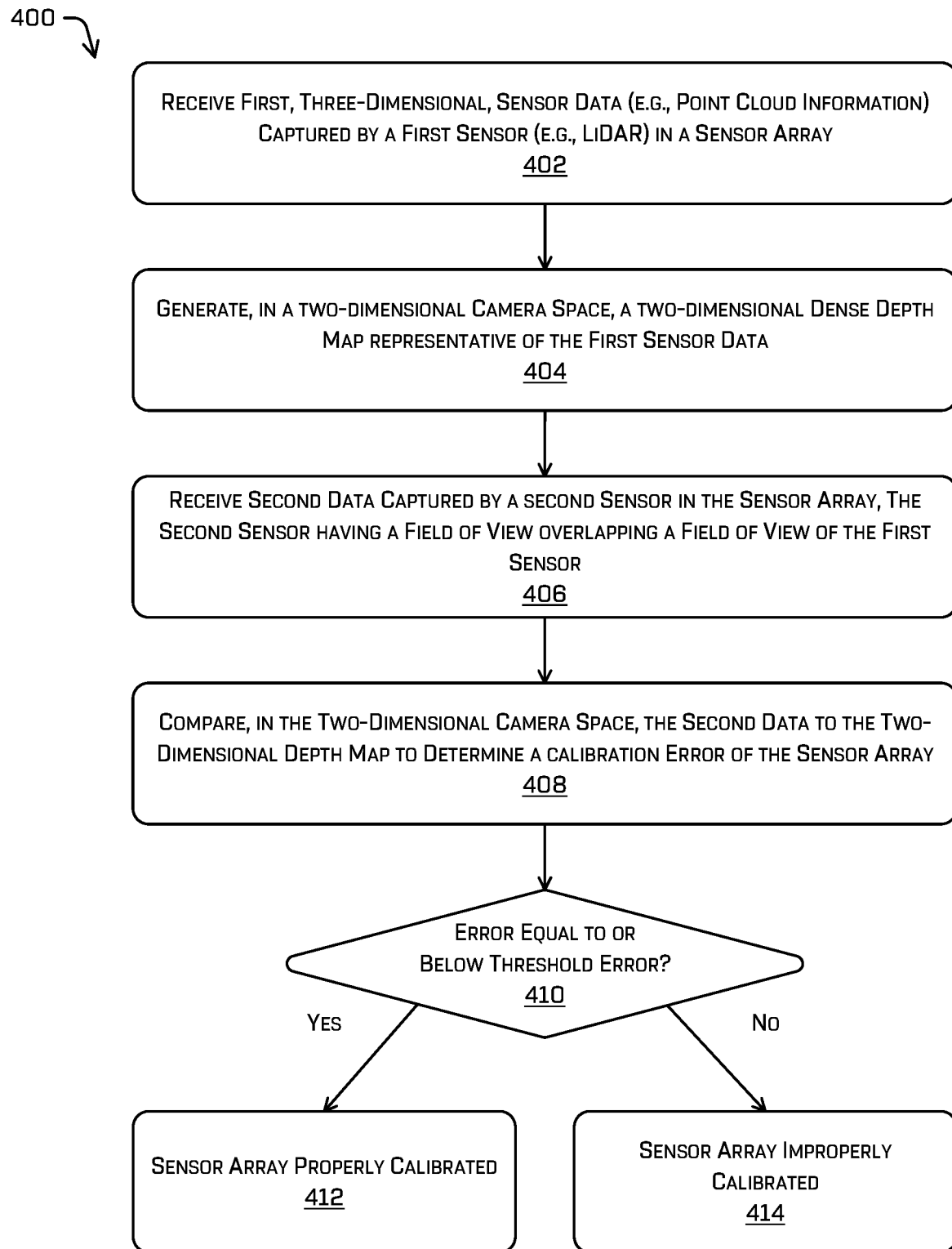
FIG. 4 is an example process of determining misalignment between sensors, in accordance with implementations described herein.

FIG. 4 depicts an example process 400 for determining calibration errors in an array of sensors using three-dimensional data captured by one of the sensors in the sensor array. For example, some or all of the process 400 can be performed by one or more components in FIG. 3, as described herein. For example, some or all of the process 400 can be performed by the calibration components 328 and/or 344.

At operation 402, the process can include receiving first, three-dimensional sensor data captured by a first sensor in a sensor array. In some examples, the sensor data may be a point cloud comprising depth and intensity information, e.g., captured by a LiDAR sensor, although other data types and/or sensors may be used. In examples described herein, the first sensor may be mounted on a vehicle, although the techniques described herein are not limited to use with vehicles. In some examples, the data may include a time stamp or the like, which may be used to identify other data captured substantially contemporaneously, such as the second image data discussed below. Moreover, by including the time stamp, techniques described herein can be performed on historical data.

At operation 404, the process 400 can include generating, in a two-dimensional camera space, a two-dimensional depth map representative of the first sensor data. For example, the vehicle computing device 304, executing the dense depth map generating component 330, can generate a mesh of the received three-dimensional data, e.g., using triangulation as described herein, and project that mesh into the two-dimensional camera space. In embodiments described herein, the two-dimensional camera space may be associated with a camera in the sensor array, although in other embodiments the camera space can be a theoretical or virtual two-dimensional space. The depth map may associate a depth value with each pixel in the camera space, based on the three-dimensional data.

At operation 406, the process 400 can include receiving second sensor data captured by a second sensor in the sensor array, the second sensor having a field of view at least partially overlapping a field of view of the first sensor and at least partially overlapping with that of the camera. For example, as illustrated in FIG. 2, the vehicle 202 can include a plurality of sensor systems, including the cameras 204 and/or the sensors 206, 208. The sensor systems have overlapping fields of view, e.g., such that the sensor array provides 360-degree sensing about the vehicle. Techniques described herein may use this sensor co-visibility, regardless of sensor type, to calibrate sensors by determining whether surfaces and/or features align in the image data captured by the different sensors.

At operation 408, the process 400 can include comparing, in the two-dimensional camera space, the second image data to the two-dimensional depth map to determine a calibration error of the sensor array. For example, in examples described herein, the second sensor data may be rendered in the two-dimensional camera space. With the first image data and the second image data in the same two-dimensional space, an orientation misalignment can be determined based on differences between the two images. In some examples described herein, e.g., when considering two LiDAR sensors, depths in the depth map should correspond, per pixel in the camera space, with depths on a second depth map, generated from the second image data. A mathematical difference between those values provides information about the extent of the misalignment. Moreover, when two depth maps are compared, other information may be compared, including but not limited to intensity values or surface normals. As detailed further herein, the geometry associated with the depth map can be used to determine intensity values in the two-dimensional camera space, and those intensity values can be compared at 408. Moreover, because segments of the mesh used to determine the depth map may be planar, surface normals, e.g., rays normal to those planes, can be determined and compared across depth maps. For example, surface normals may strongly suggest planar surfaces in the environment, e.g., road signs, or the like.

In instances in which the second image data is two-dimensional image data, e.g., RGB data, intensity data, or the like, that data may be transformed to the camera space (or the camera space may be the camera space of the camera generating the second image data). In some examples, the second image data may be further processed, e.g., to identify edges, and an error determined at 408 may include a distance between a detected edge and a depth discontinuity in the depth map. For example, techniques described herein may assume that a depth discontinuity will result at edges in the environment, and may determine a misalignment between the depth discontinuity and an edge detected in an image captured by a camera.

At operation 410, the process 400 can determine whether the error is equal to or below a threshold error. If, at 410, it is determined that the error is equal to or below the threshold, the process 400, at 412, may determine that the sensor array is properly calibrated. Thus, in some examples, no action may be taken at the vehicle or the vehicle computing system(s). Alternatively, in some instances, a calibration function, e.g., a function that minimizes the detected error, may be generated, e.g., by the calibration component 328, with subsequent sensor data being processed using the calibration function. For example, the calibration function may optimize a relative orientation of all sensors in a sensor array relative to each other, assuming a fixed relative position of the sensors and ignoring parallax, as detailed further herein.

If, at operation 410, it is determined that the error is above the threshold, at 414 the process 400 may determine that the sensor array is improperly calibrated. As described herein, techniques of this disclosure may be implemented at powering-up of a vehicle, e.g., as a safety check to determine that the sensor array is reliable. If the sensor array is determined to have more than the threshold error, however, the sensor array may be deemed unreliable and vehicle may be prohibited from going into service and/or may have some functionalities disabled or limited. For instance, a maximum speed of the vehicle may be limited. In still other embodiments, the vehicle computing device 304, e.g., executing the calibration component 328, can generate a calibration function that reduces the error. For instance, the calibration component 328 may perform an iterative process that minimizes the error. In instances in which the calibration function is able to reduce the error to below the threshold error, the sensors may be recalibrated using the calibration function.

According to the process 400, image data from multiple sensors may be projected and/or transformed into a single two-dimensional space to quickly determine misalignment in that two-dimensional space. In at least some examples, by projecting/translating the image data into the same camera space, the techniques described herein assume that the image data corresponds to features sufficiently far away from the sensors, e.g., at infinity, thereby ignoring parallax between the sensors.

Figure 5:
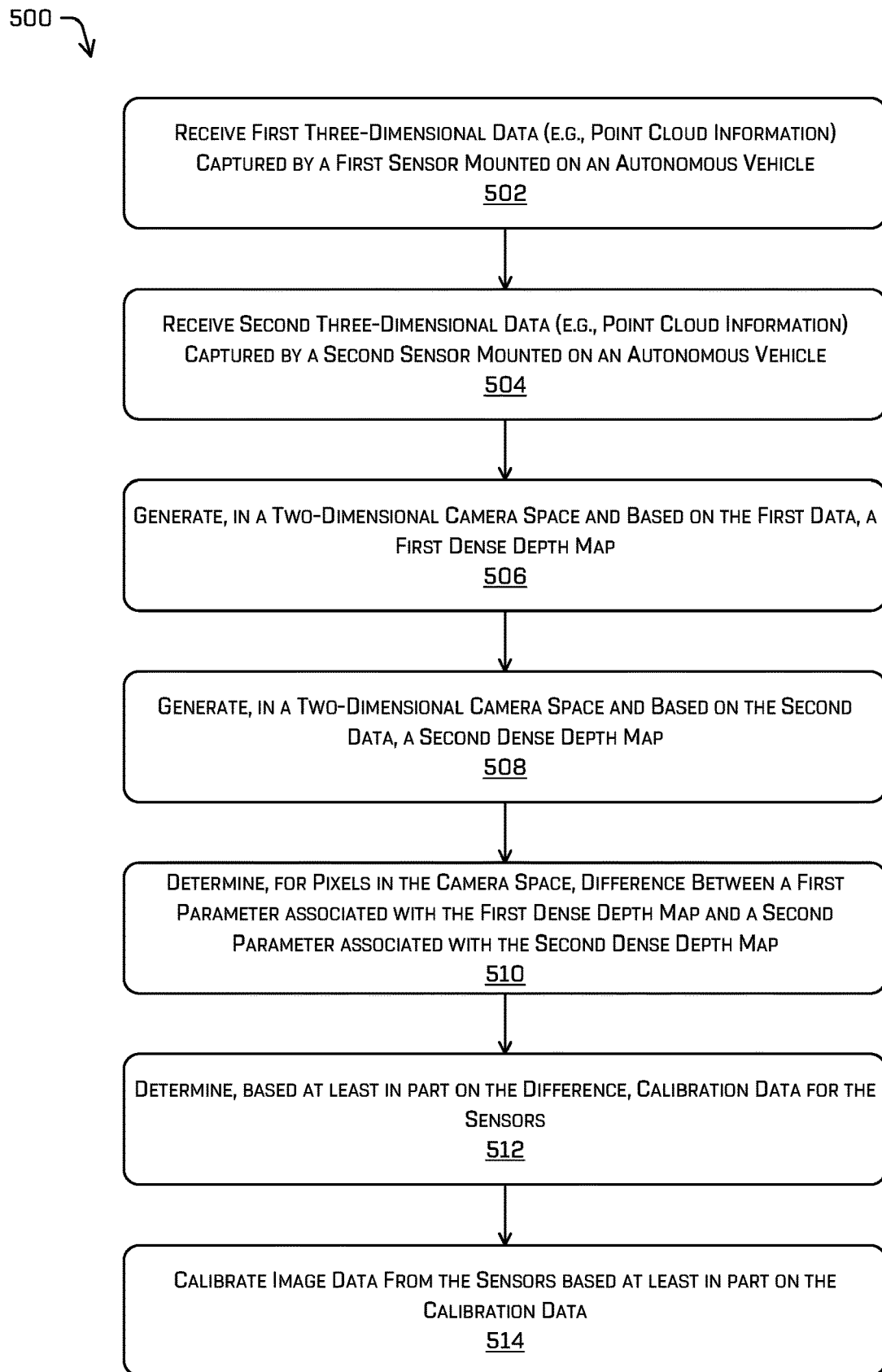
FIG. 5 is an example process for performing sensor-to-sensor calibration, in accordance with implementations described herein.

FIG. 5 depicts an example process 500 for calibrating two sensors that capture three-dimensional data, e.g., two LiDAR sensors, according to implementations of this disclosure. For example, some or all of the process 500 can be performed by one or more components in FIG. 5, as described herein. For example, some or all of the process 500 can be performed by the calibration components 328 and/or 348.

At operation 502, the process 500 can include receiving first three-dimensional data (e.g., first point cloud information) captured by a first sensor mounted on an autonomous vehicle. For example, the data may be a sparse point cloud generated by a LiDAR sensor, such as one of the sensors 206, 208.

At operation 504, the process 500 can include receiving second three-dimensional data (e.g., second point cloud information) captured by a second sensor mounted on the autonomous vehicle. For example, like the first image data, the second data may be a sparse point cloud generated by a LiDAR sensor, such as a different one of the sensors 206, 208. In implementations, the first sensor and the second sensor may have overlapping fields of view, e.g., co-visibility for at least a portion of the environment of the autonomous vehicle.

At operation 506, the process 500 can include generating, in a two-dimensional camera space and based on the first sensor data, a first dense depth map. For instance, the operation 506 may fit a mesh to the sparse point cloud, e.g., using a triangulation, such as a Delaunay triangulation, and project the mesh into the camera space.

At operation 508, the process 500 can include generating, in the two-dimensional camera space and based on the second sensor data, a second dense depth map. For instance, the operation 508 may fit a mesh to the sparse point cloud, e.g., using a triangulation, such as a Delaunay triangulation, and project the mesh into the camera space.

At operation 510, the process 500 can include determining, for pixels in the camera space, a difference between a first parameter associated with the first dense depth map and a second parameter associated with the second dense depth map. As described herein, the depth maps provide an associated depth for each pixel in the two-dimensional camera space. When the sensors are properly calibrated, at each pixel, a depth of the first dense depth map should be the same as a depth of the second dense depth map, a first intensity map (e.g., a map of intensity values of lidar returns associated with the depths used to create the depth map) should be same as a second intensity map. Moreover, depth discontinuities in the first dense depth map should align with depth discontinuities in the second dense depth map. However, misalignment of the sensors will result in a difference in these parameters. This difference may be determined at operation 510. As described herein, the difference may be a depth, although in other implementations intensity values may be associated with each pixel, in which case, intensity differences can be determined at 510. The difference may also or alternatively be determined as a distance (e.g., a Euclidian distance) between depth discontinuities. Moreover, when the mesh is comprised of a plurality of planar segments, surface normals, e.g., rays normal to those surfaces, can be compared across depth maps. For example, an angle between surface normals on a planar surface can indicate misalignment (e.g., because the planes should align).

At operation 512, the process 500 can include determining, based at least in part on the difference, calibration data for the sensors. For example, the calibration component 328 may generate a calibration function that minimizes the error between the depths/intensities/surface normals.

At operation 514, the process 500 can include calibrating image data from the sensors based at least in part on the calibration data. For example, the operation 514 can include sending the calibration data to one or more of a localization system (e.g., the localization component 320), a perception system (e.g., the perception component 322), and the like. In some instances, the calibration data can be used by one or more systems of the vehicle to align or otherwise adjust data captured by the one or more sensors so that the data can represent the environment in an accurate manner. Moreover, n implementations described herein, the calibration function can be determined relatively quickly, and at a relatively low computational cost, such that the calibration function can be applied to sensor data as the sensor data is acquired, e.g., as an operational refinement to other, more robust calibration functions that may be determined off-line, e.g., prior to deployment of the vehicle. Although the process 500 describes only a first sensor, e.g., a first LiDAR sensor, and a second sensor, e.g., a second LiDAR sensor, in other implementations multiple sensors can be calibrated. For instance, the sensor 206 and the sensors 208 may all be calibrated together, e.g., because each has a field of view that overlaps with at least one of the other sensors.

Figure 6:
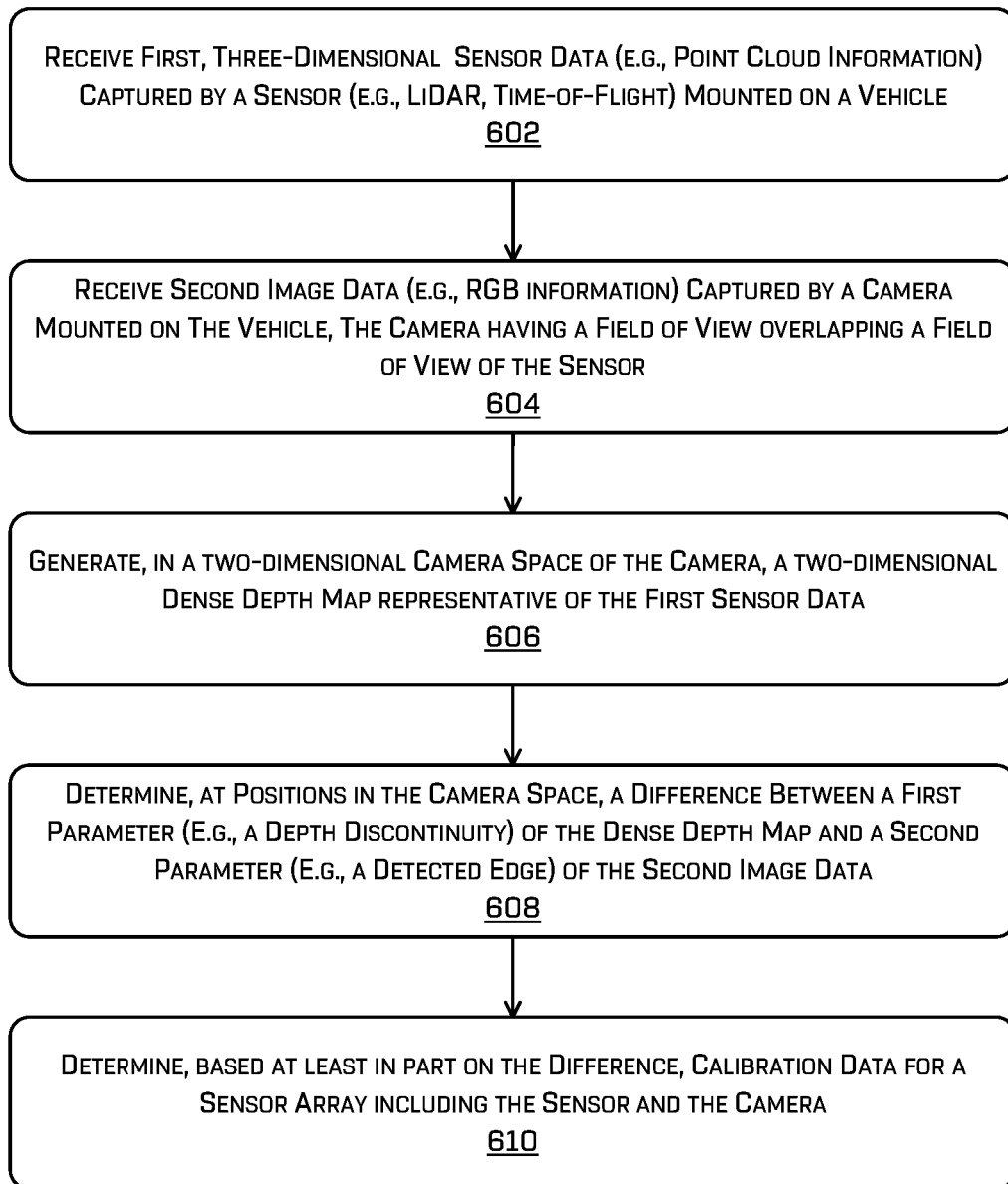
FIG. 6 is an example process for performing sensor-to-camera calibration, in accordance with implementations described herein.

FIG. 6 illustrates an example process 600 for calibrating a first sensor that captures three-dimensional data, e.g., a LiDAR sensor, and a second sensor that captures two-dimensional image data, e.g., a camera, according to implementations of this disclosure. For example, some or all of the process 600 can be performed by one or more components in FIG. 3, as described herein. For example, some or all of the process 600 can be performed by the calibration components 328 and/or 348.

At operation 602, the process 600 can include receiving first three-dimensional sensor data (e.g., first point cloud information) captured by a sensor mounted on an autonomous vehicle. For example, the sensor data may be a sparse point cloud generated by a LiDAR sensor, such as one of the sensors 206, 208.

At operation 604, the process 500 can include receiving second sensor data (e.g., RGB information, intensity information, or the like) captured by a camera mounted on the autonomous vehicle. For example, unlike the first sensor data, the second sensor data may be two-dimensional sensor data such as image data captured by a camera or other imager, such as one of the cameras 204 in FIG. 2. In implementations, the sensor and the camera may have overlapping fields of view, e.g., co-visibility for at least a portion of the environment of the autonomous vehicle.

At operation 606, the process 600 can include generating, in the two-dimensional camera space of the camera, a two-dimensional depth map representative of the first sensor data. For instance, the operation 606 may be performed by the dense depth map generation component 330, which may fit a mesh to the sparse point cloud, e.g., using a triangulation, such as a Delaunay triangulation, and project the mesh into the camera space.

At operation 608, the process 600 can include determining, for positions in the camera space, a difference between a first parameter (e.g., a depth discontinuity) of the dense depth map and a second parameter (e.g., a detected edge) of the second image data. As described herein, the depth maps provide an associated depth for each pixel in the two-dimensional camera space. Discontinuities in those depth measurements are generally associated with object edges. For example, the feature detection component 332 may determine object edges and/or image gradient magnitudes for images in the image data. For instance, an edge detection algorithm, such as a Canny edge detection algorithm, may be applied to the image received at operation 604 to determine edges in the image. Edge detection may also include applying a distance transform to pixels in the image, e.g., to quantify for each pixel in the image a straight-line distance (i.e. Euclidian distance) to the nearest edge pixel.

The comparison performed at operation 608 may include determining a distance between depth discontinuities in the dense depth map and object edges. For example, when the sensor and the camera are properly calibrated, depth discontinuities in the depth map should align to object edges in the camera image. However, misalignment of the sensor and the camera will result in a distance between the depth discontinuity and a detected edge. This difference may be determined at operation 608.

At operation 610, the process 600 can include determining, based at least in part on the difference, calibration data for a sensor array including the sensor and the camera. For example, the calibration component 328 may generate a calibration function that minimizes the distance between the depth discontinuities and the detected edges.

Although not illustrated in FIG. 6, the process 600 can also include calibrating the one or more sensors based at least in part on the calibration data. For example, the calibration data can send the calibration data to one or more of a localization system (e.g., the localization component 320), a perception system (e.g., the perception component 322), and the like. In some instances, the calibration data can be used by one or more systems of the vehicle to align or otherwise adjust data captured by the one or more sensors so that the data can represent the environment in an accurate manner.

Figure 7:
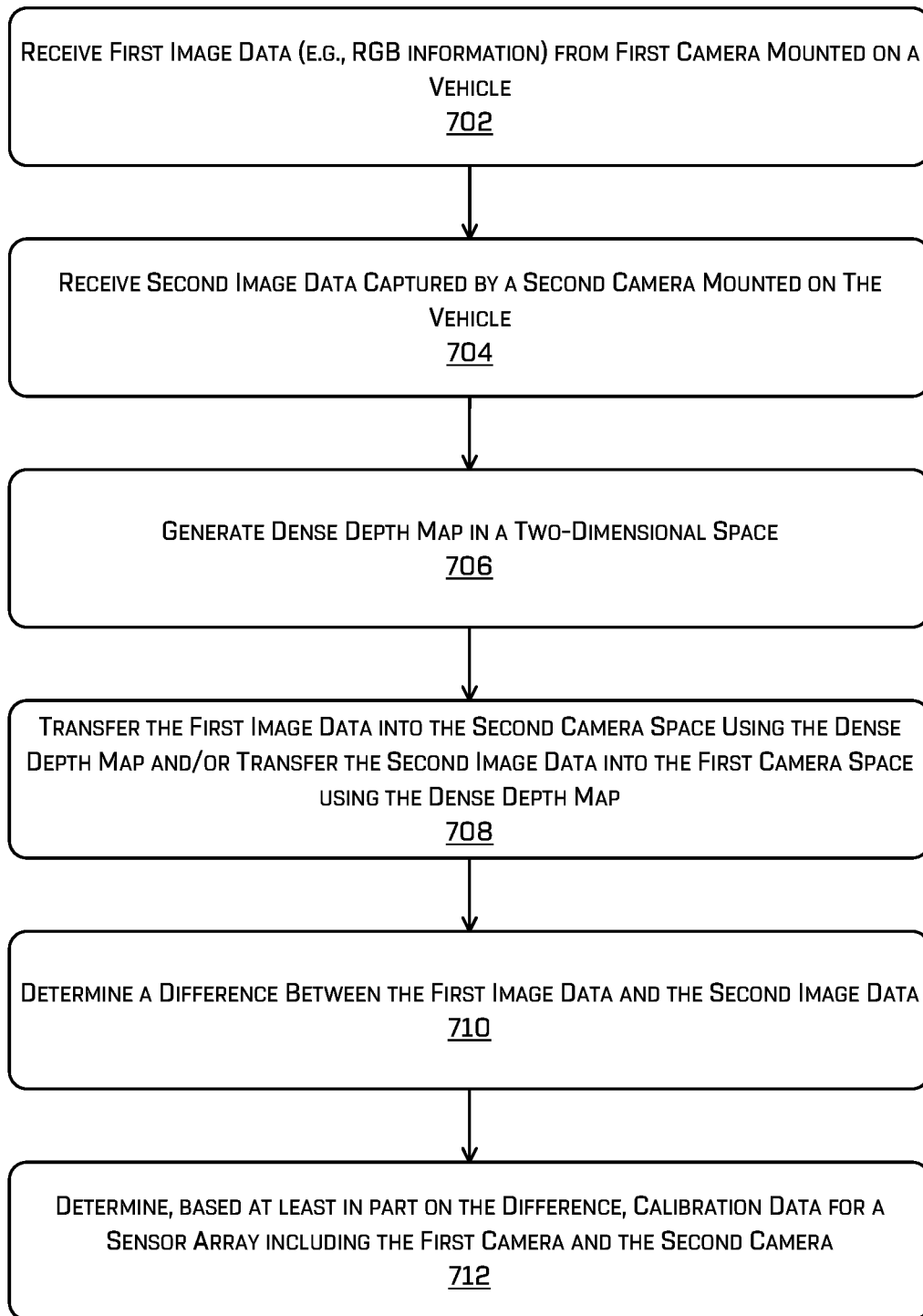
FIG. 7 is an example process for performing camera-to-camera calibration, in accordance with implementations described herein.

FIG. 7 depicts an example process 700 for calibrating two cameras in a sensor array using one or more dense depth maps. For example, some or all of the process 800 can be performed by one or more components in FIG. 3, as described herein.

At operation 702, the process 700 can include receiving first image data from a first camera mounted on a vehicle. For example, the first image data may include RGB information and/or intensity information captured by a first camera.

At operation 704, the process 700 can include receiving second image data from a second camera mounted on the vehicle. For example, the second image data may include RGB information and/or intensity information captured by a second camera. The second camera can have a field of view overlapping the field of view of the first camera.

At operation 706, the process 700 can include generating a dense depth map in a two-dimensional space, in accordance with any of the techniques described herein. For example, the dense depth map may be generated from point cloud data or other three-dimensional data received from a sensor in an array that includes the first camera and the second camera. The sensor may have a field of view that overlaps with both the field of view of the first camera and the field of view of the second camera. In some examples, the two-dimensional space may be a camera space of the first camera or of the second camera.

At operation 708, the process 700 may include transferring the first image data into the second camera space using the dense depth map and/or transferring the second image data into the first camera space using the dense depth map. For example, the techniques described herein may unproject the first image data based on the dense depth map (e.g., by casting a ray through each pixel of the image and determining an intersection with a surface defined by the depth map) and reproject the image into the image plane of the second camera (e.g., creating an image from a different point of view based on the projection) to create a first projected image and/or unproject the second image data onto the dense depth map and reproject the second image into an image plane of the first camera to create a second projected image. Although the operation 708 describes transferring the first and/or second images using the same dense depth map, in other implementations, different, or multiple, dense depth maps may be used. For instance, by using multiple dense depth maps, the cameras may be calibrated relative to one or more three-dimensional sensors, as well. Moreover, although the operation 708 describes transferring the image data using the dense depth map, as described further herein, the dense depth map may be generated using a mesh fitted to a point cloud, and in further embodiments, the image data may be transferred using the mesh. However, such transfer may require additional computing resources, e.g., because the dense depth map includes per-pixel information that will need to be recalculated each time the mesh is used.

At operation 710, the process 700 can include determining a difference between the first projected image and the second image and/or determining a difference between the first image and the second projected image. For instance, once both images are in the two-dimensional space, misalignment of edges, differences in image gradient magnitude, intensity differences, or the like may be quantified, e.g., using the error determination component 334. The differences may be distances, e.g., Euclidian distances, measured in pixels in the two-dimensional space.

At operation 712, the process 700 can include determining, based at least in part on the difference, calibration data for a sensor array including the first camera and the second camera. For example, the calibration data may be information about an orientation offset of the first camera relative to the second camera. In examples described herein, the calibration data may be expressed as a calibration function determined by optimizing an error function based on the differences determined at 710.

According to the foregoing, the processes 500, 600, 700 describe generating calibration functions for misalignment between two three-dimensional sensors, between a three-dimensional sensor and a two-dimensional sensor, and between two two-dimensional sensors. In each process 500, 600, 700, a dense depth map, generated from sparse point cloud data, is used. The processes 500, 600, 700, may be used across various sensors (including camera) pairs on the vehicle 200, to determine a calibration function for each pair. Moreover, the calibration function for each pair may be used to compute an overall calibration function for the entire sensor array. For instance, the pairs may be considered substantially simultaneously, or in parallel (e.g., jointly).

Thus, for example, techniques described herein may be used to determine and correct for misalignment of the entire sensor array.

Figure 8:
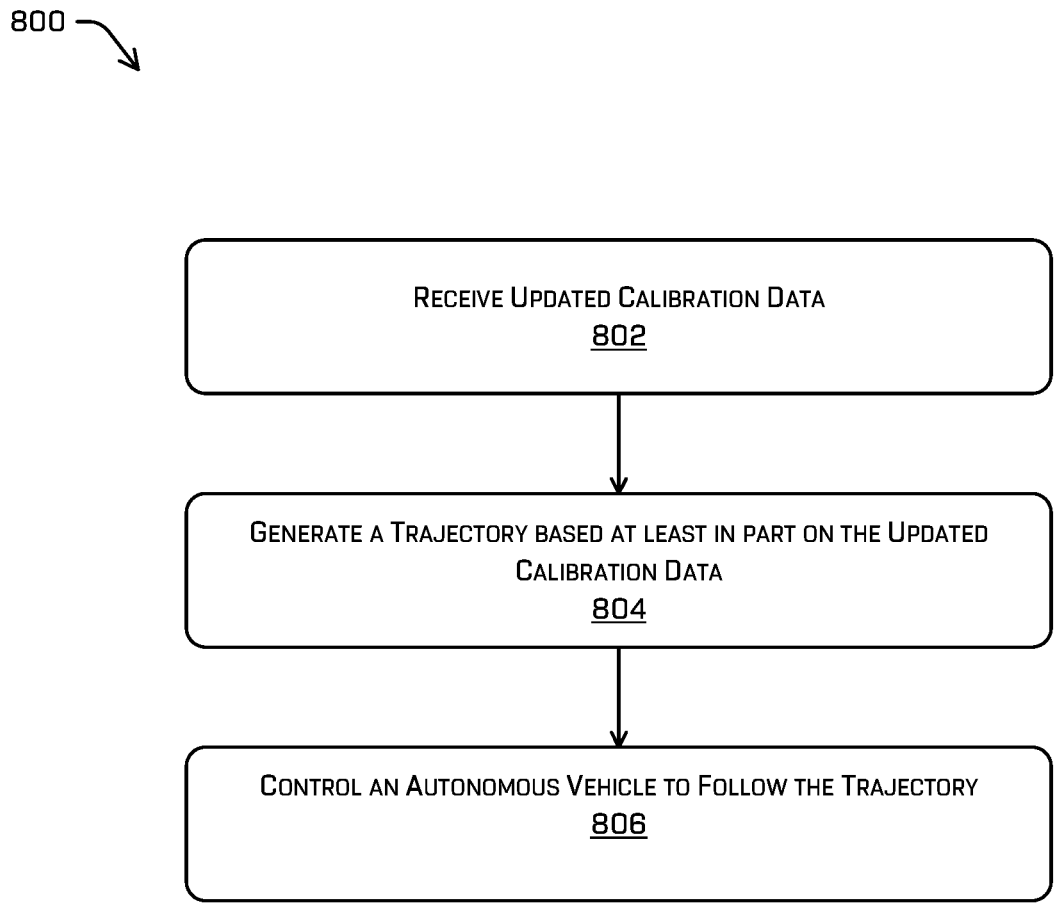
FIG. 8 is an example process for controlling an autonomous vehicle based at least in part on calibrated sensor data, in accordance with implementations described herein.

FIG. 8 depicts an example process 800 for controlling an autonomous vehicle based at least in part on calibrated sensor data, as discussed herein. For example, some or all of the process 800 can be performed by one or more components in FIG. 3, as described herein. For example, some or all of the process 800 can be performed by the localization component 320, the perception component 322, the planning component 324, and/or the one or more system controllers 326.

At operation 802, the process 800 can include receiving updated calibration data. In some instances, the calibration data can be determined using the calibration techniques discussed herein.

At operation 804, the process 800 can include generating a trajectory based at least in part on the updated calibration data. For example, the trajectory generated in the operation 804 may be based at least in part on sensor data received from one or more sensors calibrated using the calibration data. In some instances, the trajectory can be based on a presence of objects or agents external to an autonomous vehicle in an environment.

At operation 806, the process can include controlling an autonomous vehicle to follow the trajectory. In some instances, the commands generated in the operation 806 can be relayed to a controller onboard an autonomous vehicle to control the autonomous vehicle to drive the trajectory. Although discussed in the context of an autonomous vehicle, the process 800, and the techniques and systems described herein, can be applied to a variety of systems utilizing machine vision.

Example Clauses

A: An example system includes: a vehicle configured to traverse through an environment; a sensor array on the vehicle, the sensor array comprising a first camera having a first field of view, a second camera having a second field of view at least partially overlapping the first field of view, and a LiDAR sensor having a third field of view at least partially overlapping the first field of view; one or more processors; and computer-readable media storing instructions executable by the one or more processors, wherein the instructions cause the system to perform operations comprising: receiving, from the LiDAR sensor, point cloud data; generating, based at least in part on the point cloud data, a depth map in a two-dimensional space; receiving, from the first camera, a first image; receiving, from the second camera, a second image; transferring, based at least in part on the depth map, the first image into an image plane associated with the second camera as a first projected image; and determining a difference between the first projected image and the second image.

B: The system of example A, wherein: the generating the dense depth map comprises generating a mesh using the point cloud data.

C: The system of example A or example B, wherein the generating the mesh comprises generating a connectivity graph comprising triangular shapes having vertices corresponding to points in the point cloud data.

D: The system of any one of example A through example C, wherein the determining the differences comprises: determining one or more features in the image; and determining one or more distances between the one or more features in the image.

E: The system of any one of example A through example D, wherein the one or more features comprise at least one of one or more edges or one or more image gradient magnitudes.

F: The system of any one of example A through example E, wherein the vehicle is an autonomous vehicle, wherein the operations further comprise: generating, based at least in part on the difference, a calibration function; calibrating, based at least in part on the calibration function, additional image data received from the plurality of cameras as calibrated data; generating, based at least in part on the calibrated data, a trajectory to control the autonomous vehicle; and controlling the autonomous vehicle based at least in part on the trajectory.

G: An example method includes: receiving, from a first camera in an array of sensors and having a first field of view, first image data of an environment; receiving, from a second camera in the array of sensors and having a second field of view at least partially overlapping the first field of view, second image data of the environment; receiving, from a depth device, a point cloud representing the environment; generating, based at least in part on the point cloud, a first projected image comprising a projection of the first image data onto an image plane associated with the second camera; determining a difference between a first parameter associated with the first projected image and a second parameter associated with the second image; and determining, based at least in part on the difference, a calibration function for the first camera or the second camera.

H: The method of example G, further comprising: generating a dense depth map, at least in part by projecting a mesh associated with the point cloud into an image plane of one or more of the first camera, the second camera, or a virtual camera, wherein generating the first projected image is based at least in part on the dense depth map.

I: The method of example G or example H, wherein the mesh is a first mesh, the dense depth map comprises a first dense depth map associated with the mesh projected into the image plane of the first camera, and the depth device is a first depth device, the method further comprising: receiving a second point cloud from a second depth device; generating a second mesh; projecting the second mesh into a second image plane associated with the second camera; determining a second difference between the first depth map and second depth map; and calibrating the first depth device and second depth device based at least in part on the second difference.

J: The method of any one of example G through example I, wherein the mesh comprises a connectivity graph comprising triangular shapes having vertices corresponding to points in the point cloud.

K: The method of any one of example G through example J, further comprising: generating a mesh based at least in part on the point cloud, wherein generating the mesh comprises generating a connectivity graph comprising triangular shapes having vertices corresponding to points in the first point cloud, and further wherein generating the first projected image is based at least in part on the mesh.

L: The method of any one of example G through example K, wherein the determining the calibration function comprises, at least in part: generating an error function based at least in part on the difference and one or more additional differences associated with additional pairs of sensors in the sensor array; and optimizing the error function.

M: The method of any one of example G through example L, wherein the calibration function represents a relative orientation between the first sensor and the second sensor.

N: The method of any one of example G through example M, wherein the determining the difference comprises: determining one or more first features in the first projected image; determining one or more second features in the second projected image, and determining the difference as a distance between the one or more first features and the one or more second features.

O: The method of any one of example G through example N, wherein: the determining the one or more first features comprises at least one of one or more first edges in the first projected image or one or more first image gradient magnitudes in the first projected image; and the determining the one or more second features comprises at least one of one or more second edges in the second projected image or one or more first gradient magnitudes in the second projected image.

P: An example non-transitory computer-readable medium storing instructions that, when executed, cause one or more processors to perform operations comprising: receiving, from a first camera having a first field of view, first image data of an environment; receiving, from a second camera having a second field of view at least partially overlapping the first field of view, second image data of the environment; generating a first projected image comprising a projection of the first image data onto a dense depth map representing the environment and rendered in a two-dimensional space; generating a second projected image comprising a projection of the second image data onto the dense depth map; determining a difference between a first parameter associated with the first projected image and a second parameter associated with the second projected image; and determining, based at least in part on the difference, a calibration function for the array of sensors, the calibration function representing, at least in part, a relative orientation of the first camera and the second camera.

Q: The non-transitory computer-readable medium of example P, the operations further comprising: receiving point cloud data from a sensor in the array of sensors; fitting a mesh to the point cloud data; and generating the dense depth, at least in part by projecting the mesh onto the two-dimensional space, wherein the mesh comprises a connectivity graph comprising triangular shapes having vertices corresponding to points in the point cloud.

R: The non-transitory computer-readable medium of example P or example Q, wherein the determining the difference comprises: determining one or more first features in the first projected image; determining one or more second features in the second projected image, and determining the difference as a distance between the one or more first features and the one or more second features.

S: The non-transitory computer-readable medium of any one of example P through example R, wherein: the determining the one or more first features comprises determining at least one of one or more first edges in the first projected image or one or more first image gradient magnitudes in the first projected image; and the determining the one or more second features comprises determining at least one of one or more second edges in the second projected image or one or more first gradient magnitudes in the second projected image.

T: The non-transitory computer-readable medium of any one of example P through example S, wherein the determining the calibration function comprises, at least in part: generating an error function based at least in part on the difference; and optimizing the error function.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A system comprising:
a vehicle configured to traverse through an environment;
a sensor array on the vehicle, the sensor array comprising a first camera having a first field of view, a second camera having a second field of view at least partially overlapping the first field of view, and a LiDAR sensor having a third field of view at least partially overlapping the first field of view;
one or more processors; and
computer-readable media storing instructions executable by the one or more processors, wherein the instructions cause the system to perform operations comprising:
receiving, from the LiDAR sensor, point cloud data;
generating, based at least in part on the point cloud data, a depth map in a two-dimensional space;
receiving, from the first camera, a first image;
receiving, from the second camera, a second image;
transferring, based at least in part on the depth map, at least a portion of the first image corresponding to a portion of the first field of view overlapping the second field of view into an image plane associated with the second camera as a first projected image;
determining a difference between a feature in the first projected image and the feature in the second image;
generating, based at least in part on the difference, a calibration function for calibrating at least one of the first camera relative to the second camera or the second camera relative to the first camera; and
calibrating, based at least in part on the calibration function, additional images captured by at least one of the first camera or the second camera as calibrated data.

2. The system of claim 1, wherein:
the generating the dense depth map comprises generating a mesh using the point cloud data.

3. The system of claim 2, wherein the generating the mesh comprises generating a connectivity graph comprising triangular shapes having vertices corresponding to points in the point cloud data.

4. The system of claim 1, wherein the determining the difference comprises:
determining the feature in the projected image and in the second image; and
determining one or more distances between the feature in the projected image and in the second image.

5. The system of claim 4, wherein the feature comprises at least one of one or more edges or one or more image gradient magnitudes.

6. The system of claim 1, wherein the vehicle is an autonomous vehicle, wherein the operations further comprise:
generating, based at least in part on the calibrated data, a trajectory to control the autonomous vehicle; and
controlling the autonomous vehicle based at least in part on the trajectory.

7. A method comprising:
receiving, from a first camera in an array of sensors and having a first field of view, first image data of an environment;
receiving, from a second camera in the array of sensors and having a second field of view at least partially overlapping the first field of view, second image data of the environment;
receiving, from a depth device, a point cloud representing the environment;
generating, based at least in part on the point cloud, a first projected image comprising a projection of at least a portion of the first image data corresponding to a portion of the first field of view overlapping the second field of view onto an image plane associated with the second camera;
determining a difference between a feature in the first projected image and the feature in the second image;
determining, based at least in part on the difference, a calibration function for the first camera relative to the second camera or the second camera relative to the first camera; and
calibrating, based at least in part on the calibration function, additional images captured by at least one of the first camera or the second camera as calibrated data.

8. The method of claim 7, further comprising:
generating a dense depth map, at least in part by projecting a mesh associated with the point cloud into an image plane of one or more of the first camera, the second camera, or a virtual camera,
wherein generating the first projected image is based at least in part on the dense depth map.

9. The method of claim 8, wherein the mesh is a first mesh, the dense depth map comprises a first dense depth map associated with the mesh projected into the image plane of the first camera, and the depth device is a first depth device, the method further comprising:
receiving a second point cloud from a second depth device;
generating a second mesh;
projecting the second mesh into a second image plane associated with the second camera;
determining a second difference between the first depth map and second depth map; and
calibrating the first depth device and second depth device based at least in part on the second difference.

10. The method of claim 8, wherein the mesh comprises a connectivity graph comprising triangular shapes having vertices corresponding to points in the point cloud.

11. The method of claim 7, further comprising:
generating a mesh based at least in part on the point cloud, wherein generating the mesh comprises generating a connectivity graph comprising triangular shapes having vertices corresponding to points in the first point cloud, and further wherein generating the first projected image is based at least in part on the mesh.

12. The method of claim 7, wherein the determining the calibration function comprises, at least in part:
generating an error function based at least in part on the difference and one or more additional differences associated with additional pairs of sensors in the sensor array; and
optimizing the error function.

13. The method of claim 7, wherein the calibration function represents a relative orientation between the first sensor and the second sensor.

14. The method of claim 7, wherein the determining the difference comprises:
determining the feature in the first projected image;
determining the feature in the second image; and
determining the difference as a distance between the feature in the first projected image and the feature in the second image.

15. The method of claim 14, wherein:
the feature comprises at least one of a first edge in the first projected image or a first image gradient magnitude in the first projected image; and
the determining the feature in the second image comprises at least one of a second image in the second image or a second gradient magnitude in the second image.

16. A non-transitory computer-readable medium storing instructions that, when executed, cause one or more processors to perform operations comprising:
receiving, from a first camera having a first field of view, first image data of an environment;
receiving, from a second camera having a second field of view at least partially overlapping the first field of view, second image data of the environment;
generating a first projected image comprising a projection of at least a first portion of the first image data corresponding to a portion of the first field of view overlapping the second field of view onto a dense depth map representing the environment and rendered in a two-dimensional space;
generating a second projected image comprising a projection of at least a second portion of the second image data corresponding to a portion of the second field of view overlapping the first field of view onto the dense depth map;
determining a difference between a feature in the first projected image and the feature in the second projected image;
determining, based at least in part on the difference, a calibration function for the array of sensors, the calibration function representing, at least in part, at least one of an orientation of the first camera relative to the second camera or the second camera relative to the first camera; and
calibrating, based at least in part on the calibration function, at least one of the first camera or the second camera.

17. The non-transitory computer-readable medium of claim 16, the operations further comprising:
receiving point cloud data from a sensor in the array of sensors;
fitting a mesh to the point cloud data; and
generating the dense depth, at least in part by projecting the mesh onto the two-dimensional space,
wherein the mesh comprises a connectivity graph comprising triangular shapes having vertices corresponding to points in the point cloud.

18. The non-transitory computer-readable medium of claim 16, wherein the determining the difference comprises:

determining the feature in the first projected image;

determining the feature in the second projected image, and determining the difference as a distance between the feature in the first projected image and the feature in the second projected image.

19. The non-transitory computer-readable medium of claim 18, wherein:

the feature comprises at least one of a first edge in the first projected image or a first image gradient magnitude in the first projected image; and the determining the feature in the second image comprises at least one of a second image in the second image or a second gradient magnitude in the second image.

20. The non-transitory computer-readable medium of claim 16, wherein the determining the calibration function comprises, at least in part:

generating an error function based at least in part on the difference; and optimizing the error function.

* * * * *